(12) United States Patent
Jeong

(10) Patent No.: US 8,701,965 B2
(45) Date of Patent: Apr. 22, 2014

(54) VEHICLE FLOOR PRODUCTION SYSTEM

(75) Inventor: In Ho Jeong, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/605,033

(22) Filed: Sep. 6, 2012

(65) Prior Publication Data

US 2013/0056523 A1 Mar. 7, 2013

Related U.S. Application Data

(62) Division of application No. 12/284,306, filed on Sep. 19, 2008, now Pat. No. 8,348,133.

(30) Foreign Application Priority Data

Apr. 3, 2008 (KR) .......................... 10-2008-0031400

(51) Int. Cl.
*B23K 37/00* (2006.01)

(52) U.S. Cl.
USPC ............................................ 228/43; 228/47.1

(58) Field of Classification Search
None
See application file for complete search history.

(56) References Cited

U.S. PATENT DOCUMENTS

| | | | |
|---|---|---|---|
| 4,600,136 A | 7/1986 | Sciaky et al. | |
| 4,779,787 A | 10/1988 | Naruse et al. | |
| 5,044,541 A | 9/1991 | Sekine et al. | |
| 5,297,483 A | 3/1994 | Kakida et al. | |
| 5,839,721 A * | 11/1998 | Kobayashi | 271/265.02 |
| 5,893,208 A | 4/1999 | Sasaki | |
| 6,065,200 A | 5/2000 | Negre | |
| 6,145,180 A | 11/2000 | Kogai et al. | |
| 6,336,582 B1 | 1/2002 | Kato et al. | |
| 6,467,675 B1 | 10/2002 | Ozaku et al. | |
| 6,634,097 B1 | 10/2003 | Ikeda | |
| 7,475,770 B1 | 1/2009 | Strange et al. | |
| 8,393,518 B2 * | 3/2013 | Corcoran | 228/47.1 |
| 2002/0124377 A1 | 9/2002 | Nakamura | |
| 2003/0120377 A1 * | 6/2003 | Hooke et al. | 700/195 |
| 2003/0189085 A1 | 10/2003 | Kilibarda et al. | |
| 2004/0219002 A1 * | 11/2004 | Lenaers et al. | 414/459 |
| 2005/0087426 A1 | 4/2005 | Fenzl et al. | |
| 2005/0103821 A1 | 5/2005 | Bossert et al. | |
| 2005/0139451 A1 | 6/2005 | Kreuzer et al. | |
| 2005/0236461 A1 | 10/2005 | Kilibarda et al. | |
| 2005/0269382 A1 | 12/2005 | Caputo et al. | |
| 2008/0061110 A1 | 3/2008 | Monti et al. | |
| 2009/0133989 A1 | 5/2009 | Takahashi et al. | |
| 2010/0301099 A1 | 12/2010 | Sata et al. | |
| 2011/0011918 A1 | 1/2011 | Kelley | |

FOREIGN PATENT DOCUMENTS

| | | | |
|---|---|---|---|
| JP | 57084275 A | 5/1982 | |
| JP | 57209476 A | 12/1982 | |
| JP | 04-041334 | 2/1992 | |
| JP | 04-193439 | 7/1992 | |
| JP | 05015979 A | 1/1993 | |
| JP | 05050231 A | 3/1993 | |

(Continued)

*Primary Examiner* — Kiley Stoner
(74) *Attorney, Agent, or Firm* — Edwards Wildman Palmer LLP; Peter F. Corless

(57) ABSTRACT

In one aspect, the present invention provides a vehicle floor production system, in which a carrier is moved through a loop formed by a return line provided at the top of the system and a welding line provided at the bottom, and the carrier is horizontally moved by the frictional force of a horizontal movement driving means. Preferred systems can reduce the manufacturing cost and required installation area.

10 Claims, 10 Drawing Sheets

(56) References Cited

FOREIGN PATENT DOCUMENTS

| JP | FR-2723600 A1 * | 2/1996 |
| JP | 2002-060052 | 2/2002 |
| JP | 2005-298155 | 10/2005 |
| KR | 0435667 | 1/2003 |
| KR | 10-2004-0107621 | 12/2004 |
| KR | 0513524 | 12/2004 |
| KR | 10-2007-0014563 | 2/2007 |

* cited by examiner

US 8,701,965 B2

VEHICLE FLOOR PRODUCTION SYSTEM

CROSS-REFERENCE TO RELATED APPLICATION

This application is a divisional application of U.S. application Ser. No. 12/284,306, filed Sep. 19, 2008, now U.S. Pat. No. 8,348,133, which claims under 35 U.S.C. §119 (a) the benefit Korean Patent Application No. 10-2008-0031400, filed Apr. 3, 2008, the entire contents of which are incorporated herein by reference.

BACKGROUND (a) Technical Field

The present invention relates to a vehicle floor production system. More particularly, the present invention relates to a vehicle floor production system, in which a working line is disposed at the bottom of the system and a return line is disposed at the top so as to ensure safety and working space.

(b) Background Art

As shown in exemplary FIG. 1, a conventional front floor 100 forming an engine room 101 of a vehicle in general includes a dash panel 110, left and right fender apron members 112 and 113, and a radiator support member 114. The dash panel 110 serves as a partition between the engine room and a passenger room and prevents noise and vibration from being introduced into the passenger room. The left and right fender apron members 112 and 113 are butt-welded at predetermined regions of left and right sides of the dash panel 110 so that the front portions thereof extend toward the vehicle front. Accordingly, the left and right fender apron members 112 and 113 support left and right side portions of the engine and a transmission and fix the upper part of a strut of a front suspension. Both side portions of the radiator support member 114 are butt-welded to the front surfaces of the left and right fender apron members 112 and 113 so as to support the structure of a cooling system including an air conditioner and a radiator.

The above-described panel and members (hereinafter referred to as a panel) are welded to each other to form the front floor 100.

Exemplary FIG. 2 is a configuration diagram showing a conventional front floor production system which generally comprises a linear motor 121, a stopper 122, a carrier 123, a turntable 124, a welding robot 125, and an unloading robot 126.

In the conventional front floor production system, the carrier 123 that restricts the panel is moved using the linear motor 121 in a non-contact manner and is rotated by the turntable 124 in a welding process. After completion of the welding process, the panel is unloaded from the carrier 123 by the unloading robot 126 and transferred to the following line. Accordingly, the stopper 122 stops the carrier 123 at a desired position during transfer to the following line, thus regulating the position of the carrier 123.

The operation order of the system having the above-described configuration is described below.

(1) The panel is loaded on the carrier 123 in process-A, and the carrier 123 is transferred to process-B.

(2) When the turntable 124 is rotated, the carrier in process-B is transferred to process-C and subjected to the welding process, and the carrier 123 of process-C is returned to process-B so that the unloading robot 126 unloads the panel from the carrier 123.

(3) The carrier 123 of process-D is transferred to process-A so that another panel is loaded thereon.

(4) The carrier 123 of process-B after completion of unloading is transferred to process-D to stand by.

In the conventional linear motor, since the number of the linear motors is large, the manufacturing cost is suitably increased and, since the capacity of inverters for controlling the motors is increased, the manufacturing cost is further increased and the size of a control panel that is needed is thus increased. Accordingly, with the increase in the control panel, the installation area is also increased.

Moreover, in the case of an inverter-type linear motor, a stopper is needed during stop, and an impact absorbing means is used to reduce impact force during stop, which is consumable and unfavorable for preservation, and thus causes a cost increase.

Furthermore, since the linear motor is driven in a non-contact manner, an error in speed control frequently occurs and, in order to maintain a gap between the linear motor and the carrier, the manufacturing and assembling costs are increased.

In addition, because a process has to be added every time a vehicle type is added, the system operation is restrictive, and the manufacturing cost of the turntable is high.

The above information disclosed in this Background section is only for enhancement of understanding of the background of the invention and therefore it may contain information that does not form the prior art that is already known in this country to a person of ordinary skill in the art.

SUMMARY

In one aspect, the present invention is directed to a vehicle floor production system, in which a carrier is moved through a loop formed by a return line provided at the top of the system and a welding line provided at the bottom, and the carrier is horizontally moved by the frictional force of a horizontal movement driving means, such preferred systems can reduce the required manufacturing cost and installation area.

In one embodiment, the present invention provides a vehicle floor production system, in which the carrier is handled by a carrier changing robot, and thus a carrier loading stand of the system does not require any separate device for handling the carrier, thus contributing to simplification of the system.

In another embodiment, the present invention provides a vehicle floor production system comprising: a return line and a welding line provided parallel or substantially parallel to each other on the top and bottom of a frame so as to move a carrier; a carrier drop means including a guide rail provided on the top thereof to load a panel on the carrier received from the return line and move the carrier to the welding line; a horizontal movement driving means for moving the carrier in the horizontal direction on the return line, the welding line and the carrier drop means by frictional force; a welding robot for welding the panel moved by the horizontal movement driving means in a predetermined section of the welding line; and a carrier changing robot including a carrier handling hanger provided at an end of an arm portion thereof to move the carrier from the welding line to the return line after completion of the panel welding process.

In another preferred embodiment, the return line and the welding line include first and second driving wheels provided to move the carrier, and a portion of the first driving wheel of the return line is moved upward and mounted to ensure a working space of a welding robot.

In still another preferred embodiment, the carrier drop means comprises: a frame including a guide rail provided on the top thereof; a vertical column for supporting the frame to slidably move in the up and down direction; a horizontal column for connecting the top portion of the vertical column; an up-and-down movement motor provided on the top of the horizontal column; a power transmission means for transmitting the rotational force of the up-and-down movement motor to the frame; and a weight balance connected to an end portion of the power transmission means and moving up and down at the opposite side of the frame to adjusting the balance.

In still another preferred embodiment, the power transmission means comprises: a rotation transmission shaft connected to an output shaft of the motor and including a pulley provided on the outer surface thereof; and a belt, of which one end is connected to the frame and a middle portion is engaged with the pulley so as to transmit the rotational force of the motor.

In yet another preferred embodiment, the horizontal movement driving means comprises: a friction bar fixedly provided in the longitudinal direction of the carrier; a horizontal movement motor and a decelerator provided on the frame on which the carrier drop means, the return line, and the welding line are provided; a friction wheel driven by the horizontal movement motor and the decelerator and transmitting the rotational force of the motor by being contact with one side of the friction bar; a guide wheel rotatably provided on both sides of the friction bar to be in contact therewith; and an idle wheel provided on the opposite side of the friction bar to be in contact therewith.

In still yet another preferred embodiment, the horizontal movement driving means further comprises: a hinge pin rotatably supported to the frame; first and second rotational members, of which center portions are rotatably connected to the hinge pin; and a gap adjusting bolt and a spring inserted between end portions of the first and second rotational members, wherein the motor, the decelerator, and the friction wheel are provided on one side of the first rotational member, and the idle wheel is provided on one side of the second rotational member, and wherein the friction wheel and the idle wheel are in frictional contact with the friction bar by the elastic force of the spring, and a gap between the first and second rotational members is adjusted by the gap adjusting bolt.

In a further preferred embodiment, the system further comprises a carrier loading stand capable of loading carriers classified by vehicle type, wherein the carrier loading stand includes a vertical frame provided in the vertical direction and a loading frame provided in the horizontal direction on the top and bottom thereof, and a carrier of the welding line and a carrier of the carrier loading stand are changed by the carrier changing robot.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated by the accompanying drawings which are given hereinafter by way of illustration only, and thus are not imitative of the present invention, and wherein.

Figure 1:
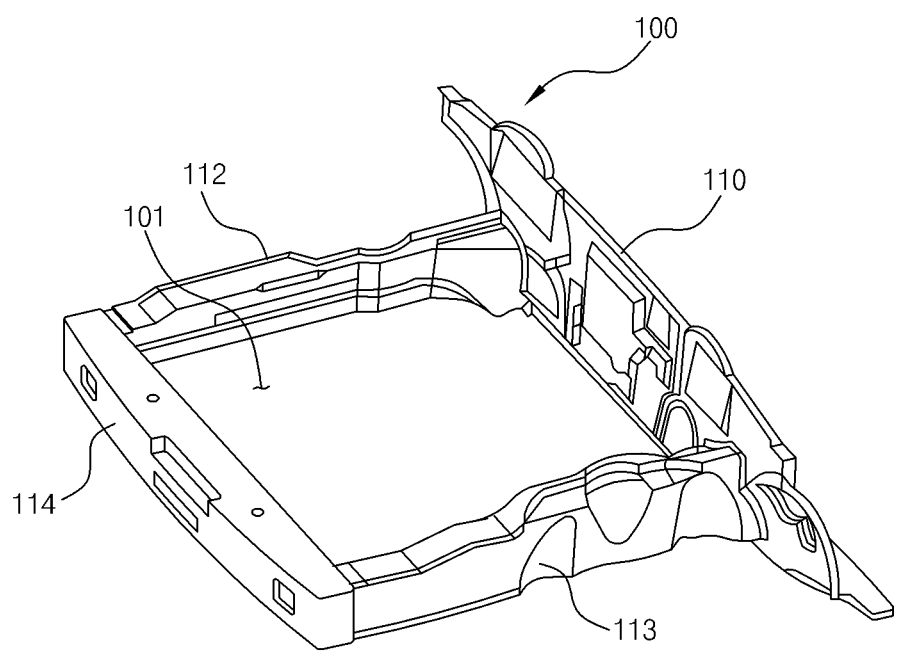
FIG. 1 is a perspective view showing a conventional front floor forming an engine room of a vehicle.

Reference numerals set forth in the Drawings includes reference to the following elements as further discussed below:

10: drop lifter
11: horizontal movement driving means
12: carrier
13: carrier loading stand
14: unloading robot
15: carrier changing robot
16: welding robot
17: welding line
18: return line
19: guide rail
20: up-and-down movement frame
21: first driving wheel
22: electricity and air supply
23: vertical column
24: horizontal column
25: connection frame
26: up-and-down movement motor
27: timing belt
28: weight balance
29: guide roller
30: decelerator
31: induction motor
32: friction wheel
33: idle wheel
34: friction bar
35: first member
36: second member
37: hinge pin
38: spring
39: bolt
40: nut
41: first driving rail
42: second driving rail
43: jig unit
44, 56: fixing pin
45: frame
46: vertically extending frame
47: arm
48: second driving wheel
50: carrier handling hanger -continued 52: guide wheel
54: vertical frame
55: horizontal frame It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

As described herein, the present invention includes a vehicle floor production system comprising a return line and a welding line to move a carrier, a carrier drop means, a horizontal movement driving means, and a welding robot for welding the panel moved by the horizontal movement driving means in a predetermined section of the welding line.

In certain embodiments, the vehicle floor production system further comprises a carrier changing robot including a carrier handling hanger provided at an end of an arm portion thereof to move the carrier from the welding line to the return line after completion of the panel welding process. In other embodiments, the horizontal movement driving means moves the carrier in the horizontal direction on the return line, the welding line and the carrier drop means by frictional force. In other embodiments, the return line and a welding line provided parallel or substantially parallel to each other on the top and bottom of a frame so as to move a carrier. In still further embodiments, the carrier drop means includes a guide rail provided on the top thereof to load a panel on the carrier received from the return line and move the carrier to the welding line.

The invention also includes a motor vehicle comprising the vehicle floor production system as described in any of the aspects herein.

Reference will now be made in detail to the preferred embodiments of the present invention, examples of which are illustrated in the drawings attached hereinafter, wherein like reference numerals refer to like elements throughout. The embodiments are described below so as to explain the present invention by referring to the figures.

Figure 2:
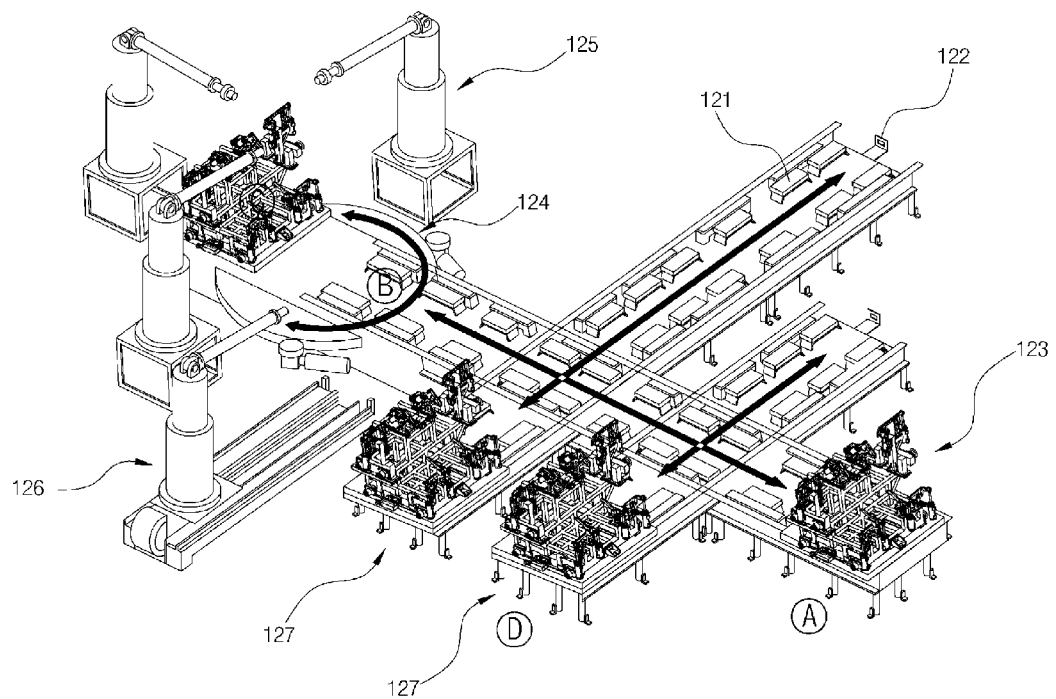
FIG. 2 is a configuration diagram showing a conventional front floor production system.
Figure 3:
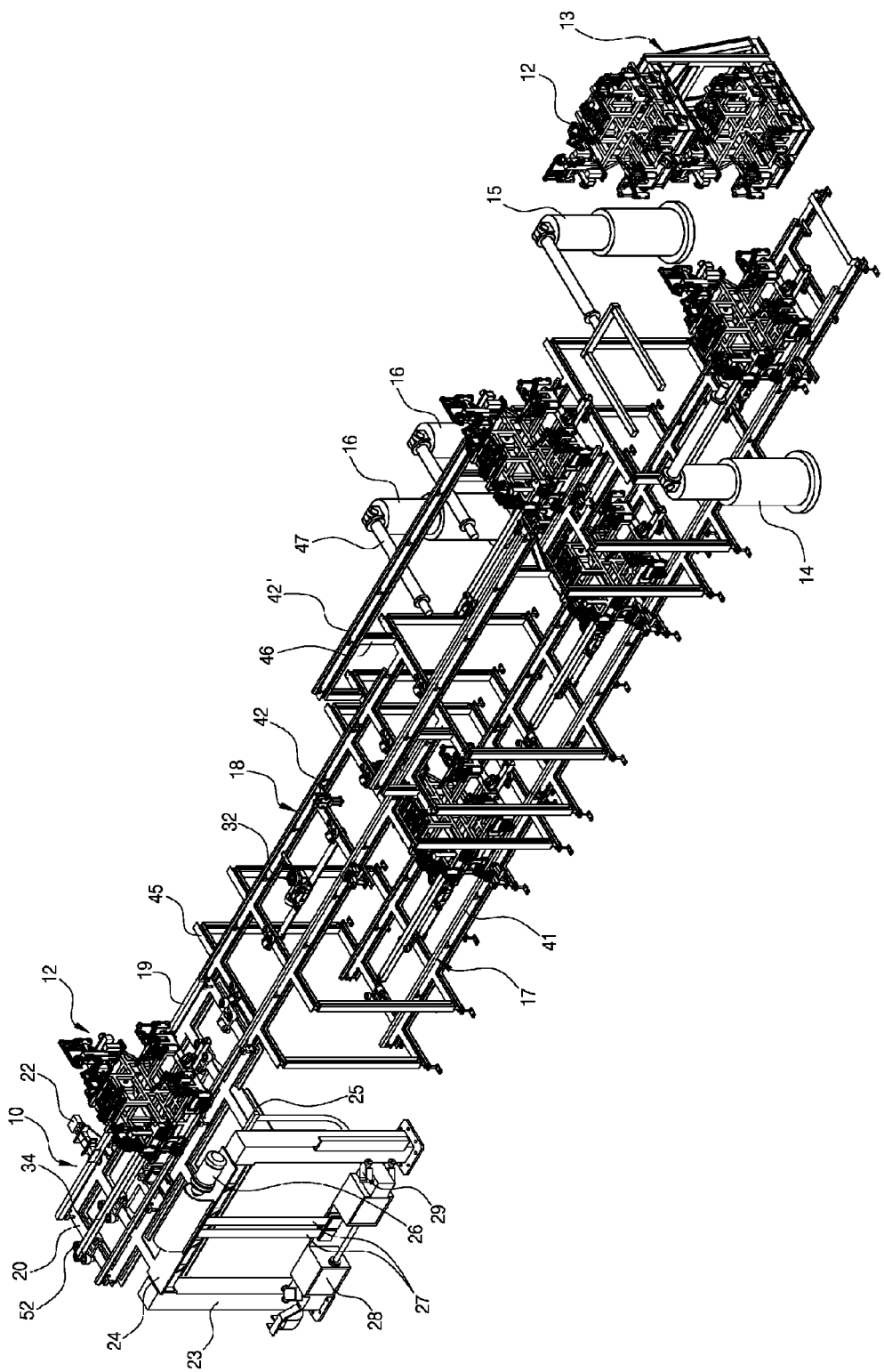
FIG. 3 is a configuration diagram showing a front floor production system in accordance with a preferred embodiment of the present invention.
Figure 4:
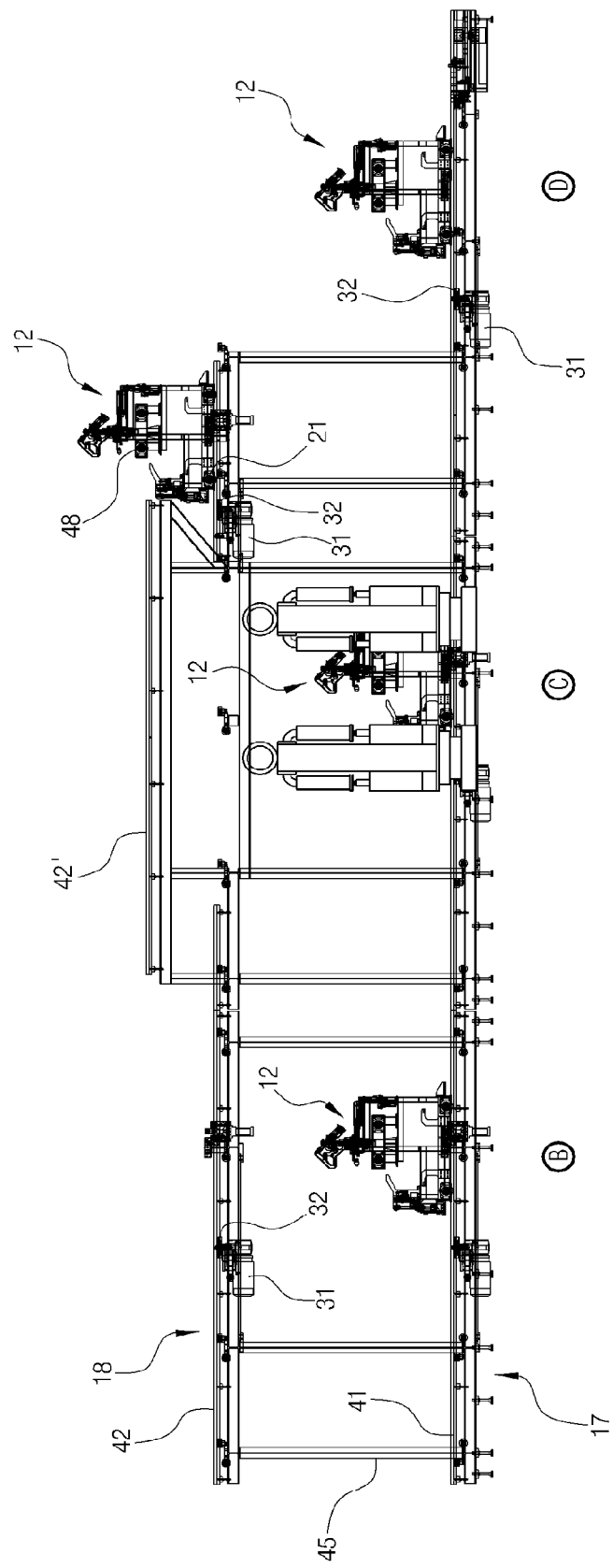
FIG. 4 is a front view of a welding line and a return line of FIG. 3.
Figure 5:
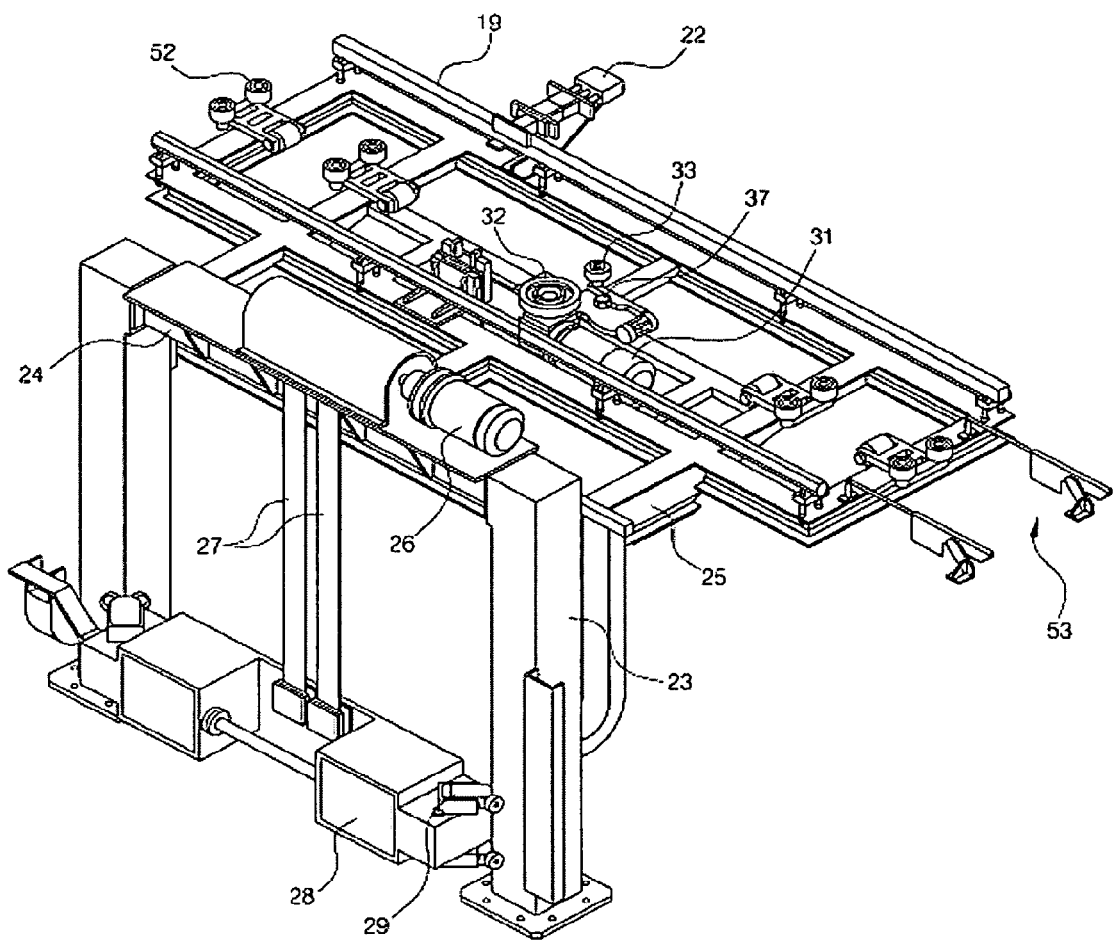
FIG. 5 is a configuration diagram showing a drop lifter of FIG. 3.
Figure 6:
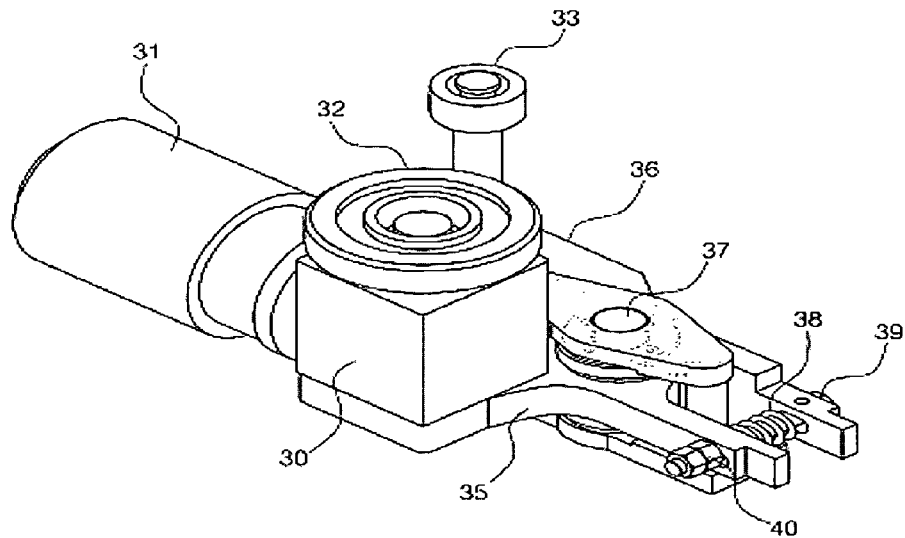
FIG. 6 is a configuration diagram showing a horizontal movement driving means of FIG. 3.
Figure 7:
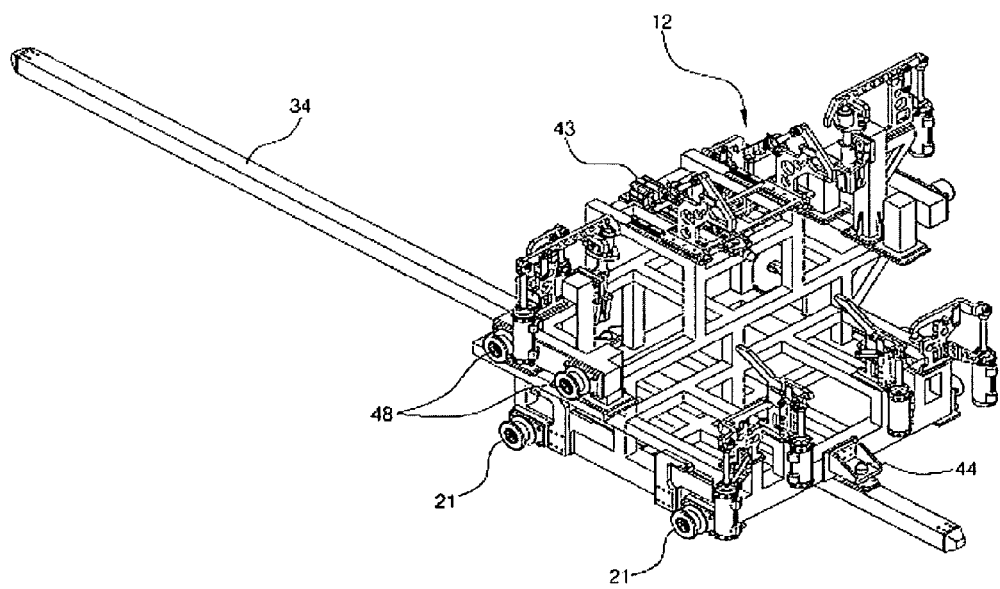
FIG. 7 is a perspective view showing a state where a friction bar is attached to a carrier of FIG. 3.
Figure 8:
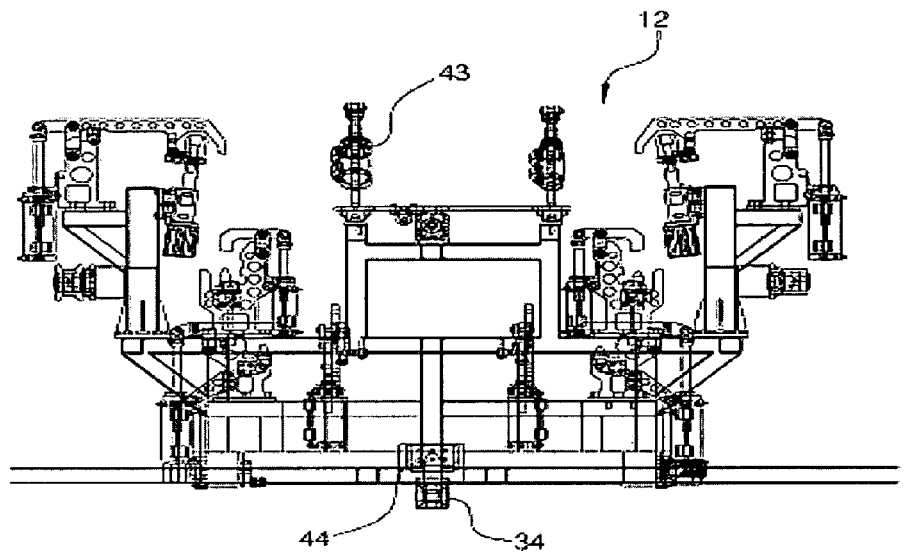
FIG. 8 is a rear view of FIG. 7.
Figure 9:
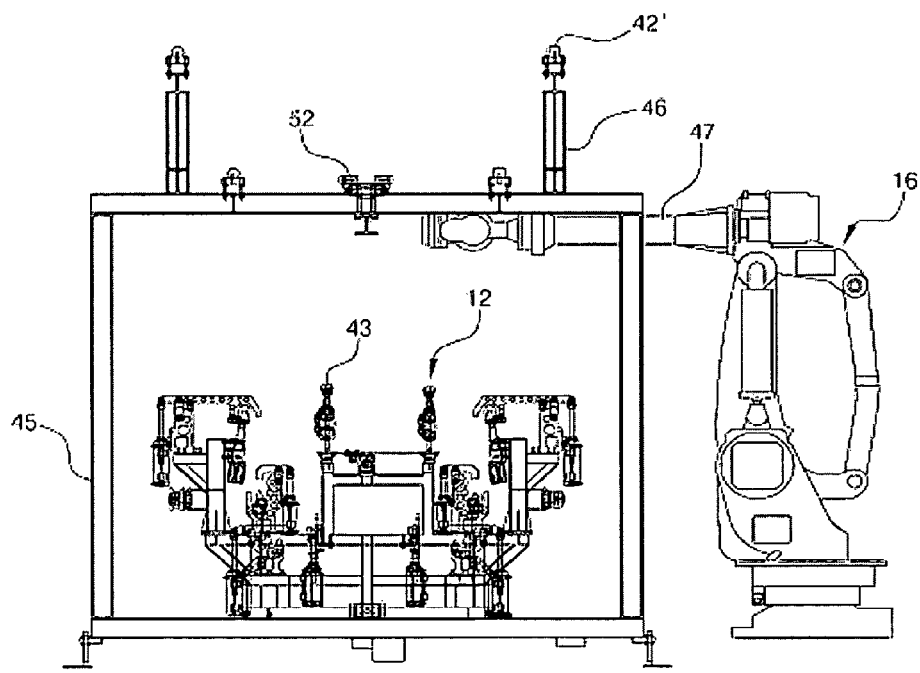
FIG. 9 is a side view showing a working state of a welding robot of FIG. 3.
Figure 10:
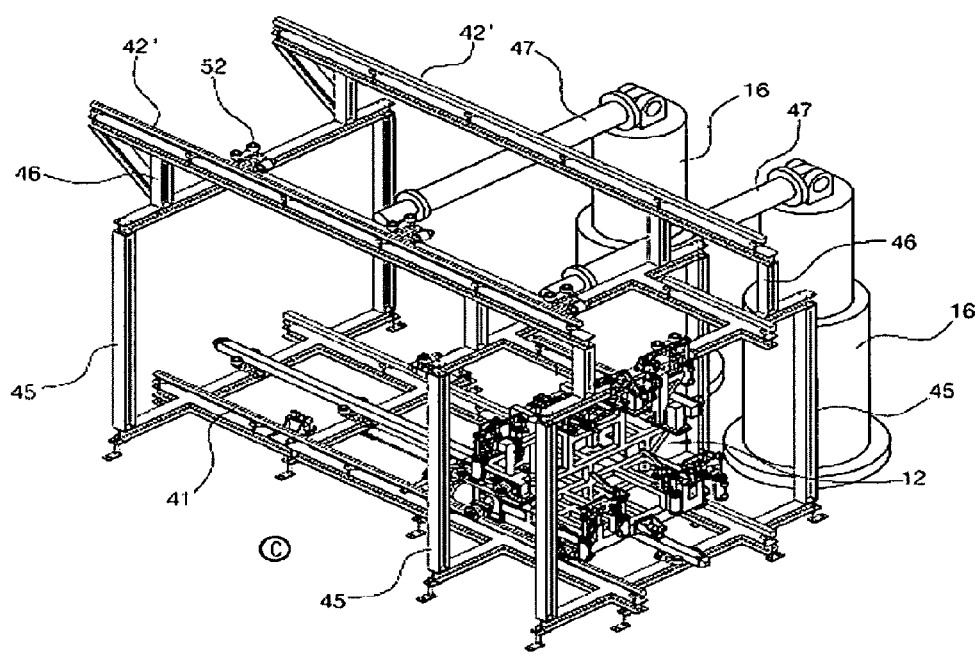
FIG. 10 is a configuration diagram showing a welding section of FIG. 3.
Figure 11:
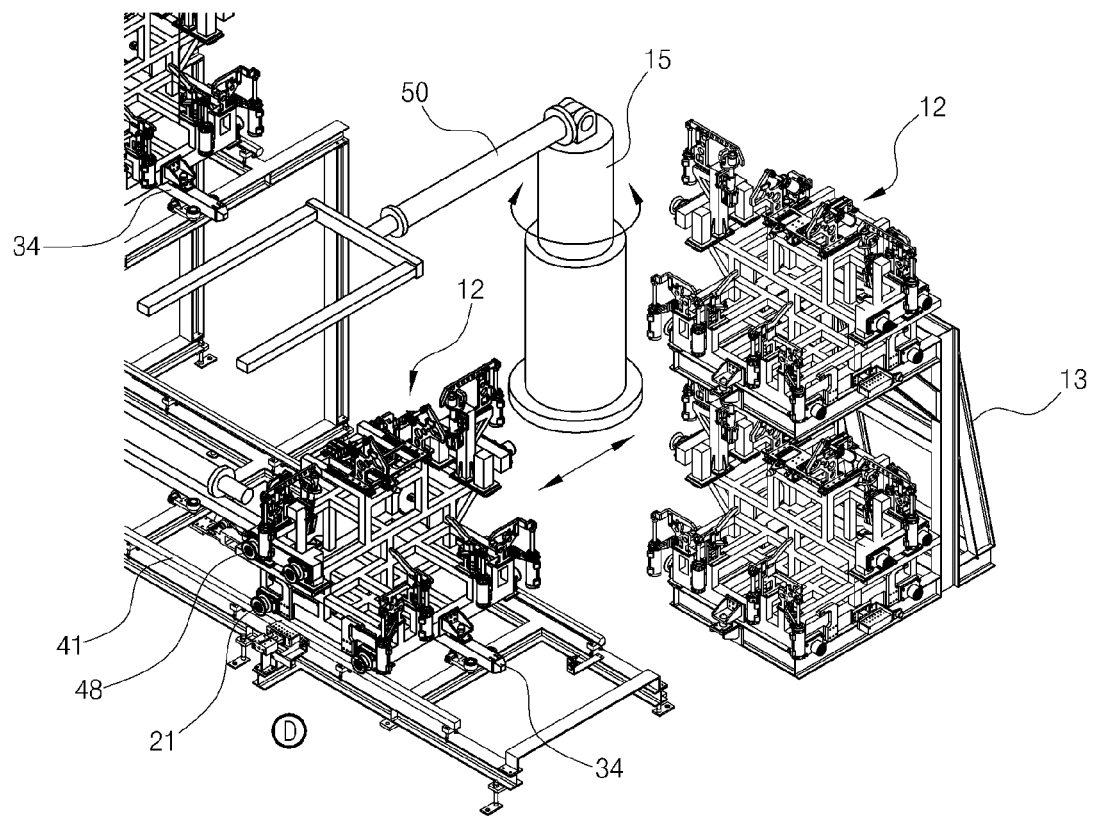
FIG. 11 is a diagram showing an unloading section and a carrier changing robot.
Figure 12:
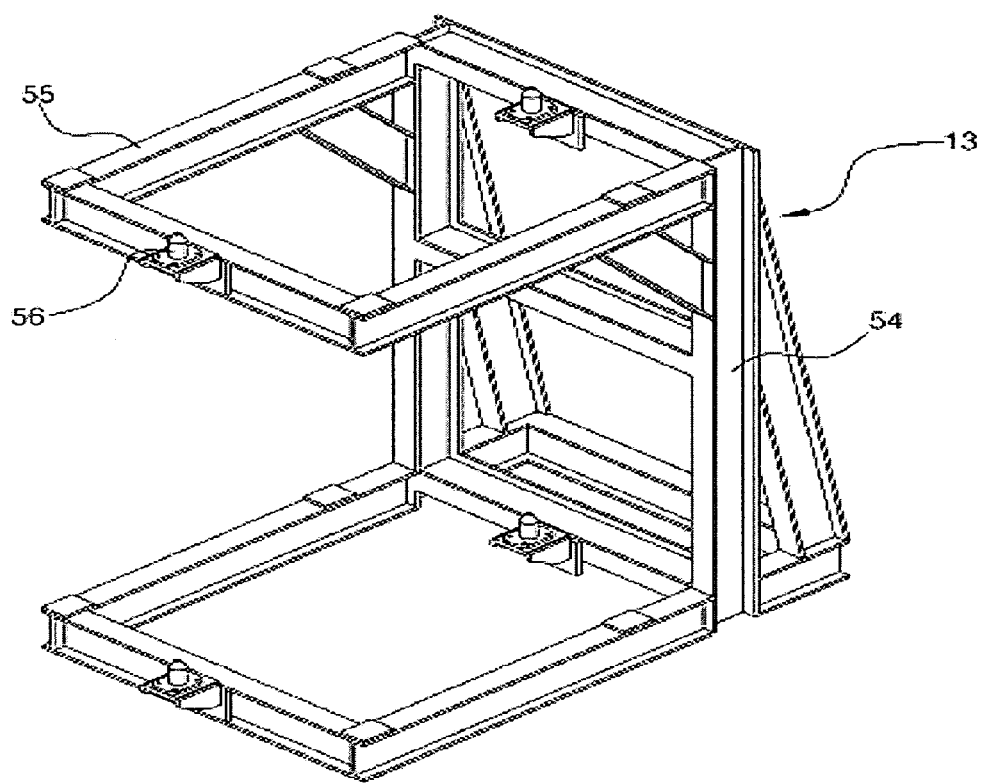
FIG. 12 is a perspective view showing a carrier loading stand.

Exemplary FIG. 1 is a perspective view showing a conventional front floor forming an engine room of a vehicle, FIG. 2 is an exemplary configuration diagram showing a conventional front floor production system, FIG. 3 is an exemplary configuration diagram showing a preferred front floor production system in accordance with a preferred embodiment of the present invention, exemplary FIG. 4 is a front view of a suitable welding line and a suitable return line of FIG. 3, exemplary FIG. 5 is a configuration diagram showing a suitable drop lifter of FIG. 3, exemplary FIG. 6 is a configuration diagram showing a suitable horizontal movement driving means of FIG. 3, exemplary FIG. 7 is a perspective view showing a state where a friction bar is attached to a carrier of FIG. 3, exemplary FIG. 8 is a rear view of FIG. 7, exemplary FIG. 9 is a side view showing a working state of a suitable welding robot of FIG. 3, exemplary FIG. 10 is a configuration diagram showing a welding section of FIG. 3, exemplary FIG. 11 is a diagram showing an unloading section and a carrier changing robot, and exemplary FIG. 12 is a perspective view showing a carrier loading stand.

A front floor production system in accordance with a preferred embodiment of the present invention suitably comprises a drop lifter 10 (carrier drop means), a horizontal movement driving means 11, a carrier 12, a carrier loading stand 13, an unloading robot 14, a carrier changing robot 15, and a welding robot 16.

In certain embodiments according to the present invention, a welding line 17 and a return line 18 are suitably independently provided in consideration of production and working stability. Preferably, the welding line 17 is suitably provided at the bottom of the system and the return line 18 is suitably provided at the top such that the carrier 12 is circulated through the welding line 17 and the return line 18 for the front floor production.

Preferably, the drop lifter 10 is an up-and-down movement means for dropping the carrier 12. Accordingly, the drop lifter 10 receiving the carrier 12 returned to the return line 18 preferably moves down to transfer the carrier 12 to the welding line 17 and then is suitably returned to the original position.

Preferably, the drop lifter 10 comprises an up-and-down movement frame 20 including guide rails 19 suitably formed parallel or substantially parallel to each other on the top thereof, a support means for suitably supporting the up-and-down movement frame 20 so as to move up and down, and a carrier drop means and a power transmission means, provided on the support means to suitably move the up-and-down movement frame 20 in the up and down direction.

In one embodiment of the invention, the guide rails 19 are preferably provided on the top of the up-and-down movement frame 20 so that a first driving wheel 21 of the carrier 12 returned along the return line 18 may move along the guide rails 19. In certain examples, the up-and-down movement frame 20 has a lattice structure including a plurality of vertical members suitably formed parallel to each other in the longitudinal direction thereof and a plurality of horizontal members suitably formed in the width direction to substantially connect the vertical members.

In further embodiments, a horizontal movement driving means 11 for horizontally moving the carrier 12 is suitably provided in or near the middle of the up-and-down movement frame 20 so as to transfer the carrier 12, and an electricity and air supply 22 is preferably provided on one side of the guide rail 19 in the width direction so as to suitably supply electric power and air to the carrier 12.

Preferably, the support means includes two vertical columns 23 suitably positioned on one side of the up-and-down movement frame 20 to support the up-and-down movement frame 20 so as to move up and down, and a horizontal column 24 suitably connecting the upper portions of the vertical columns 23.

In other embodiments, the lower portions of the vertical columns 23 are preferably fixed to the ground by means of a bolt, and a vertical movement block, which supports a connection frame 25 suitably extending from the up-and-down frame 20 in the width direction so as to move up and down, and a horizontal bar connecting the vertical movement block are suitably provided on one side of the vertical column 23.

In further preferred embodiments, an up-and-down movement motor 26 as the carrier drop means is suitably provided on the top of the horizontal column 24, a timing belt 27 as the power transmission means for transmitting the rotational force of the motor 26 is suitably provided, and a weight balance 28 as a balance means for preferably adjusting the weight and balance of the up-and-down movement frame 20 is suitably provided at the bottom thereof.

In other preferred embodiments, a pulley shaft including a pulley connected to an output shaft of the motor 6 preferably extends in the longitudinal direction thereof, and at least one end of the timing belt 27 is suitably connected to a connection bar and the other end is suitably connected to the weight balance 28. Accordingly to preferred embodiments of the invention, when the motor 26 rotates in one direction, the up-and-down movement frame 20 connected to the connection bar moves up, and the weight balance 28 suitably moves down. According to other embodiments of the invention, when the motor 26 rotates in the other direction, the up-and-down movement frame 20 connected to the connection bar moves down, and the weight balance 28 preferably moves up.

In other embodiments of the invention, the weight balance 28 is preferably provided on the opposite side of the up-and-down movement frame 20 with the vertical column 23 preferably interposed therebetween, and a guide roller 29 is preferably installed on one side of the weight balance 28 to suitably facilitate the up and down movement of the weight balance 28.

Accordingly, the horizontal movement driving means drives the carrier 12 by friction when the carrier 12 horizontally moves on the welding line 17 and the return line 18. In particular preferred embodiments, the horizontal movement driving means drives the carrier 12 preferably by using an induction motor 31 suitably equipped with a decelerator 30 and bringing a friction bar 34 of the carrier 12 into contact between a friction wheel 32, that is, for example, rotatably provided on the top of the decelerator 30, and an idle wheel 33, that is in other preferred embodiments rotatably provided on the opposite side thereof.

In exemplary embodiments, a rotation shaft of the friction wheel 32 is connected to an output shaft of the decelerator 30. Accordingly, the induction motor 31, the decelerator 30, and the friction wheel 32 are preferably provided on one side of a first member 35, and the idle wheel 33 is preferably provided on one side of a second member 36. In exemplary embodiments, center portions of the first and second members 35 and 36 are connected by a hinge pin 37, and the other sides of the first and second members 35 and 36 are preferably connected by a bolt 39 and a nut 40 with a spring 38 inserted therebetween.

According to certain embodiments of the invention, when the bolt 39 is screwed into the nut 40, the spring 38 is suitably compressed, and thus the gap between the first and second members 35 and 36 on spring side is substantially closed based on the hinge pin 37 and the gap between the friction wheel 32 and the idle wheel 33 on the opposite side is suitably widened. In other exemplary embodiments, when the bolt 39 is unscrewed from the nut 40, the spring 38 is suitably restored, and thus the gap between the first and second members 35 and 36 on the spring side is widened based on the hinge pin 37 and the gap between the friction wheel 32 and the idle wheel 33 on the opposite side is closed.

According to embodiments of the invention as described herein, since the friction wheel 32 and the idle wheel 33 are in frictional contact with the friction bar 34 due to the elastic force of the spring by suitably adjusting the bolt 39 and the nut 40, the rotational force of the induction motor 31 is suitably transferred to the friction bar 34 through the friction wheel 32 and the idle wheel 33, thus enabling the carrier 12 to horizontally move.

According to other further embodiments, since the present invention enables the carrier 12 to horizontally move in a frictional contact manner, it is possible to suitably reduce the number of motors and the capacity of the inverters for controlling the motors and thus, preferably, to more accurately and rapidly control the speed of the friction bar 34 by the motor control, compared with the conventional non-contact manner.

In preferred embodiments, the carrier 12, preferably including a jig unit 43 for restricting the panel, is a suitably means for transferring the restricted panel to each process. In other further embodiments, the friction bar 34 is suitably attached to the bottom of the carrier 12 so as to transfer the frictional force, i.e., the driving force, by the horizontal movement driving means 11. For example, in certain exemplary embodiments, the friction bar 34 is detachably mounted to the carrier 12 to suitably improve the handling of the carrier 12 and facilitate the safekeeping of the carrier 12. For example, in preferred embodiments, the friction bar 34 may be suitably attached to both sides of the bottom portion of the carrier 12 by a fixing pin 44.

In other embodiments, the welding line 17 in accordance with the present invention in which a key welding process is suitably performed by a welding robot 16 is preferably provided on the first floor, and the return line 18 is disposed on the top of the welding line 17 so as to improve the workability of the welding robot 16.

In still other further embodiments, on the welding line 17 and the return line 18, first and second driving rails 41 and 42 are preferably provided parallel to each other in the horizontal direction on the top and bottom of a plurality of rectangular frames 45 suitably provided at regular intervals such that the carrier 12 may move along the first and second driving rails 41 and 42.

Accordingly, in preferred embodiments, the rectangular frames 45 are preferably provided in the vertical direction, the return line 18 is disposed on the rectangular frames 45, and the welding line 17 is preferably disposed below the rectangular frames 45.

In further exemplary embodiments, the welding line 17 may be suitably divided into a loading section (B) where the carrier 12 is loaded, a welding section (C) where the panel is welded by the welding robot 16, and an unloading section (D) where the welded panel is unloaded. In other further embodiments, the return line 18 may be suitably divided into a first return section where the carrier 12, from which the panel has been unloaded, moves upward, and a second return section where the carrier 12 moves from the first return section to the loading section.

In certain embodiments of the invention, the loading section (B), the welding section (C), and the unloading section (D) of the welding line 17 are preferably arranged in a straight line, and the first and second return sections of the return line 18 are suitably provided on different floors.

In other embodiments of the invention, a second driving rail 42' of the first return section is preferably supported by a vertically extending frame 46 provided on or near the top of the rectangular frame 45 in the vertical direction, and thus the height of the second driving rail 42' is larger than that of the second return section as much as the height of the vertically extending frame 46.

Accordingly, in certain embodiments of the invention, the second driving rail 42' of the first return section preferably has a greater height than that of the second return section in order to prevent an arm 47 of the welding robot 16 during up and down movement from being interrupted by the second driving rail 42 of the second return section having the same height as the second driving rail 42' of the first return section.

For example, the second driving rail 42 of the first return section is preferably moved upward so that the arm 47 of the welding robot 16 may freely move in the welding section (C) and, since the second return section is substantially out of the working radius of the welding robot 16, the second driving rail 42 is preferably provided on the top of the rectangular frame 45.

In preferred embodiments, the carrier 12 includes, but is not limited to, a second driving wheel 48 preferably mounted on the top side thereof to drive along the second driving rail 42' of the first return section, and a first driving wheel 21 preferably mounted on the bottom side to drive along the introduction portion of the first return section, the second driving rail 42 of the second return section, and the first driving rail 41 of the welding line 17.

In exemplary embodiments, the horizontal movement driving means is preferably provided at each section of the welding line 17 and the return line 18, and the drop lifter 10 is provided at a line panel loading side (A) so as to move the carrier

12 from the return line 18 to the welding line 17 and preferably employs a carrier changing robot 15 as a carrier lift means to lift the carrier, from which the panel has been unloaded, to the return line 18.

In certain examples, the carrier changing robot 15 includes, but is not limited to, a carrier handling hanger 50 mounted on the arm portion in order to preferably move the carrier 12, from which the panel has been unloaded, to the return line 18 and move another carrier 12 of a different vehicle type from the carrier loading stand 13 to the return line 18.

Preferably, the carrier loading stand 13 is a place where the carriers 12 classified by vehicle type are loaded and kept and includes a vertical frame 54 provided in the vertical direction and a horizontal frame 55 supported in the horizontal direction on the top and bottom portions of the vertical frame 54, in which a fixing pin 56 for fixing the carrier 12 is provided on the horizontal frame 55.

According to further embodiments, the carriers 12 are preferably kept on the first and second floors of the carrier loading stand 13, and thus provide excellent space utilization. According to other embodiments, the carrier 12 is handled by the carrier changing robot 15, and preferably the carrier loading stand 13 does not require any separate device for handling the carrier 12, and thus the system is suitably simplified and the manufacturing cost is reduced.

According to exemplary embodiments of the invention, the operation order of the floor production system in accordance with the invention as described herein, will be set forth below.

(1) After the carrier 12 is returned to the guide rail 19 of the drop lift 10 through the second return section of the return line 18, the panel to be welded is preferably loaded on the carrier 12 at the A-side.

(2) With the operation of the up-and-down movement motor 26, the timing belt 27 suitably rotates in one direction, and thus the up-and-down frame 20 of the drop lifter 10 moves down. Then, with the operation of the motor 26 in the horizontal movement driving means of the drop lifter 10, the friction wheel 32 rotates, and thus the carrier 12 is moved to the loading section (B) of the welding line 17 by the frictional force of the friction wheel 32 and the friction bar 34. Subsequently, the carrier 12 enters the welding section (C) so that the welding robot 16 performs the key welding process, thus completing a front floor.

(3) After completion of the key welding process, when the induction motor 31 in the horizontal movement driving means at the welding section (C) operates so that the friction wheel 32 rotates, the carrier 12 is preferably moved to the unloading section (D) of the welding line 17 by the frictional force of the friction wheel 32 and the friction bar 34. Subsequently, the unloading robot 14 transfers the completed front floor to the following line.

(4) After the front floor is unloaded, the carrier 12 is preferably moved up to the first return section of the return line 18 by the carrier changing robot 15 and, when the induction motor 31 in the horizontal movement driving means at the welding section (C) operates so that the friction wheel 32 rotates, the carrier 12 is preferably moved to the second return section of the return line 18 by the frictional force of the friction wheel 32 and the friction bar 34. At this time, the up-and-down frame 20 of the drop lifter 10 returned to the original position receives the carrier 12 from the second return section and is moved down by the carrier drop means.

Here, the carrier changing robot 15 determines the vehicle type of the carrier 12 and, if the carrier 12 is needed to be changed, suitably changes the carrier 12 with another carrier 12 of the corresponding vehicle type in the carrier loading stand 13.

Then, in preferred embodiments of the invention as described herein, the above-described operations in the order of drop lifter 10→welding line 17 [loading (B), welding (C), and unloading (D)]→return line 18 are continuously repeated to produce the front floors.

In certain embodiments, the working line is provided at the top and the return line is provided at the bottom in the conventional system, and accordingly, the working height of the robots is suitably increased and all of the equipment is installed at high position, and thus the maintenance and reliability are lessened.

Accordingly, in preferred embodiments, the present invention preferably places the key welding process on the first floor so as to ensure the safety and stability of the system.

In further embodiments, the present invention preferably features a center floor and a rear floor besides the front floor.

As described herein, the vehicle floor production system in accordance with the present invention has, but is not limited to, the following effects.

According to preferred embodiments of the invention, the rotational force of the motor is suitably transferred to the carrier by the frictional contact between the friction bar attached to the carrier and the friction wheel mounted on the line.

Accordingly, it is possible to reduce the manufacturing cost, compared with the conventional linear motor by the non-contact power transmission.

Moreover, in other further embodiments, since the welding line is preferably provided at the bottom of the system and the return line is preferably provided at the top to reduce the working height, according to other further embodiments, it is possible to ensure the safety and reliability of the system.

According to exemplary embodiments, a portion of the return line is moved substantially upward and the driving wheels of the carrier are provided in two stages, thus it is possible in other further embodiments to ensure the working space of the welding robot.

In further embodiments, the friction bar is detachably mounted to the carrier, thus it is possible to improve the handling of the carrier and facilitate the safekeeping of the carrier.

In other further embodiments, the robot is handled by the robot, thus the carrier loading stand preferably does not require any separate device for handling the carrier, thus simplifying the system and reducing the manufacturing cost.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A motor vehicle produced by a vehicle floor production system that comprises:
   a return line and a welding line provided parallel to each other on a top and bottom of a frame so as to move a carrier;
   a carrier drop means including a guide rail provided on the top thereof to load a panel on the carrier received from the return line and move the carrier to the welding line;
   a horizontal movement driving means for moving the carrier in the horizontal direction on the return line, the welding line and the carrier drop means by frictional force;
   a welding robot for welding the panel moved by the horizontal movement driving means in a predetermined section of the welding line; and
   a carrier changing robot including a carrier handling hanger provided at an end of an arm portion thereof to move the carrier from the welding line to the return line after completion of the panel welding process;
   wherein the return line and the welding line include first and second driving wheels provided to move the carrier, and a portion of the first driving wheel of the return line is moved upward and mounted to ensure a working space of a welding robot.

2. The motor vehicle produced by the vehicle floor production system of claim 1 wherein the carrier drop means comprises:
   a frame including a guide rail provided on the top thereof;
   a vertical column for supporting the frame so as to slidably move in the up and down direction;
   a horizontal column for connecting the top portion of the vertical column;
   an up-and-down movement motor provided on the top of the horizontal column;
   a power transmission means for transmitting the rotational force of the up-and-down movement motor to the frame; and
   a weight balance connected to an end portion of the power transmission means and moving up and down at the opposite side of the frame to adjusting the balance.

3. The motor vehicle produced by the vehicle floor production system of claim 2 wherein the power transmission means comprises:
   a rotation transmission shaft connected to an output shaft of the motor and including a pulley provided on the outer surface thereof; and
   a belt, of which one end is connected to the frame and a middle portion is engaged with the pulley so as to transmit the rotational force of the motor.

4. The motor vehicle produced by the vehicle floor production system of claim 3 wherein the horizontal movement driving means comprises:
   a friction bar fixedly provided in the longitudinal direction of the carrier;
   a horizontal movement motor and a decelerator provided on the frame on which the carrier drop means, the return line, and the welding line are provided;
   a friction wheel driven by the horizontal movement motor and the decelerator and transmitting the rotational force of the motor by being contact with one side of the friction bar;
   a guide wheel rotatably provided on both sides of the friction bar to be in contact therewith; and
   an idle wheel provided on the opposite side of the friction bar to be in contact therewith.

5. The motor vehicle produced by the vehicle floor production system of claim 4 wherein the horizontal movement driving means further comprises:
   a hinge pin rotatably supported to the frame;
   first and second rotational members, of which center portions are rotatably connected to the hinge pin; and
   a gap adjusting bolt and a spring inserted between end portions of the first and second rotational members,
   wherein the motor, the decelerator, and the friction wheel are provided on one side of the first rotational member, and the idle wheel is provided on one side of the second rotational member, and
   wherein the friction wheel and the idle wheel are in frictional contact with the friction bar by the elastic force of the spring, and a gap between the first and second rotational members is adjusted by the gap adjusting bolt.

6. A vehicle floor production system that comprises:
   a return line and a welding line to move a carrier;
   a carrier drop means;
   a horizontal movement driving means; and
   a welding robot that welds the panel moved by the horizontal movement driving means in a predetermined section of the welding line;
   a carrier loading stand capable of loading carriers classified by vehicle type, wherein the carrier loading stand includes a vertical frame provided in the vertical direction and a loading frame provided in the horizontal direction on a top and bottom thereof, and a carrier of the welding line and a carrier of the carrier loading stand are changed by a carrier changing robot.

7. The vehicle floor production system of claim 6 wherein the vehicle floor production system further comprises the carrier changing robot including a carrier handling hanger provided at an end of an arm portion thereof to move the carrier from the welding line to the return line after completion of the panel welding process.

8. The vehicle floor production system of claim 6 wherein the horizontal movement driving means moves the carrier in the horizontal direction on the return line, the welding line and the carrier drop means by frictional force.

9. The vehicle floor production system of claim 6 wherein the return line and a welding line provided parallel to each other on the top and bottom of a frame so as to move a carrier.

10. The vehicle floor production system of claim 6 wherein the carrier drop means includes a guide rail provided on the top thereof to load a panel on the carrier received from the return line and move the carrier to the welding line.

* * * * *